United States Patent Office 3,456,987
Patented July 22, 1969

3,456,987
METHOD FOR TRANSPORTING POTASH THROUGH A PIPELINE IN SLURRY FORM
Ralph C. Hughes and Richard L. Every, Ponca City, Okla., assignors to Continental Oil Company, Ponca City, Okla., a corporation of Delaware
No Drawing. Continuation-in-part of application Ser. No. 532,413, Jan. 6, 1966. This application Aug. 29, 1967, Ser. No. 663,984
Int. Cl. B65g 53/30
U.S. Cl. 302—66    7 Claims

ABSTRACT OF THE DISCLOSURE

Potash can be prewetted with a low molecular weight alcohol, slurried in a hydrocarbon carrier and pumped through a pipeline. The treatment prevents compacting of the potash when the slurry is quiescent and renders the potash readily resuspendable when motion of the carrier is resumed.

RELATED APPLICATIONS

This is a continuation-in-part of our application, Ser. No. 532,413, filed Jan. 6, 1966, which was in turn a continuation-in-part of our application, Ser. No. 362,947, filed Apr. 27, 1964, this last-mentioned application being now abandoned, and the first-mentioned application now being U.S. Patent No. 3,359,040.

DISCLOSURE

This invention relates to transportation of particulate particles of potash (KCl) via pipeline in a hydrocarbon carrier liquid.

At the present time, it is commonly found necessary in industry to move or store substantially large quantities of solids. Not uncommonly these solids are in the form of relatively small grains or particles which, in some circumstances, are moved and handled by methods similar to those employed in moving and handling fluids. Unfortunately, however, when such pulverant materials are thus handled and, more particularly, when they are allowed to stand for relatively short periods of time, it is not uncommon for these materials to compact and thereby become no longer amenable to fluid handling methods. When this occurs, it is necessary to mechanically move and separate such pulverant materials to re-establish their fluid form.

In order to overcome this undesirable aspect of pulverant material handling, various schemes have been attempted. For instance, it has been suggested that constant agitation can be utilized to maintain such materials in a fluid condition. This, of course, requires a constant output of energy with attendant costs which, on occasion, render the economic feasibility of material handling marginal or nonexistent. In addition, it has been suggested that certain pulverant materials may be slurried with a liquid to overcome the problems characteristic of dry material handling. Unfortunately, however, this has not always proved to be a satisfactory solution to problems of compaction, and, in addition, it has been found that subsequent separation of the liquid from the solid is not always easy to accomplish. Moreover, it is not uncommon that certain portions of the liquid are lost by adsorption on the surfaces of the solids. When water or other similar inexpensive materials are utilized to slurry solid pulverant materials, this loss of material is, of course, no particular economic drawback. On the other hand, when certain other fluids, such a hydrocarbons and the like are utilized as the carrier liquid in a slurry, loss of these materials through adsorption on the solids constitutes a major obstacle to economic practice of the slurrying technique. Consequently, in spite of numerous attempts which have been made to handle pulverant material quickly, easily and without undue economic loss, a method for handling such materials without objectionable compaction and further without objectionable loss of a carrier material has, until the present invention, remained an elusive desideratum.

Some of the methods proposed by the prior art include forming an emulsion and incorporating the solids in the emulsion prior to introducing the particles into the carrier fluid, see for example U.S. Patent 2,042,425 and 2,128,913. There are two particular disadvantages to this method, first being that the emulsifying agent is introduced as a contaminant and secondly this necessitates breaking the emulsion in addition to the cost of equipment and emulsifier. Another method has been proposed to transport the particles in water by first wetting the particles with a hydrocarbon. See U.S. 2,686,085 and German Patent 939,018 wherein coal is so transported.

In our earlier filed application, we taught that wetting of solid particles which were nonreactive with or soluble in the carrier fluid with a second fluid, also nonreactive with a solute for the particles and nonmiscible with the carrier fluids would aid in transporting all such solid particles. In our copending application we found that while this is still true, e.g., coal wetted with a hydrocarbon to be transported in water, that a number of difficulties are encountered when the flow of fluids stops or drops into the laminar flow range, particularly below 3000 Reynolds number. Under such conditions, the lighter hydrocarbon, being less polar than water and having less surface tension will float away from the coal or solid particle. If, due to power failure or other cause, the pipeline flow ceases, the particles so treated settle out and compact. It is then extremely difficult, if not impossible, to reform the slurry in the absence of mechanical reaming or the like. Also, slurries prepared by prewetting with a hydrocarbon prior to slurrying in water, when allowed to settle, the solids tend to compact and the hydrocarbon comes to the surface.

According to the present invention, a solid pulverant potash is first wetted with a low molecular weight alcohol which is adsorbed on the surface of the solid. The solid with the adsorbed alcohol is then mixed with a hydrocarbon carrier liquid to form a slurry which can then be stored for an indefinite period without objectionable compaction and which can be pumped through a pipeline without objectionable compaction within the pipeline.

A wide range of particle sizes can be handled according to the teachings of our invention. As such these materials may be of uniform size or may have a fairly wide size distribution, and may be of uniform shape or may be plastic. The size and shape, aside from certain limits hereinafter set forth, are without effect in practicing the present invention.

Before the solid material can be utilized with the present invention, it should, where necessary, be reduced in size to particles not more than about one-half inch in diameter. While the one-half inch limitation is by no means critical, it will, as a practical matter, be found that equipment difficulty will be encountered in attempting to pump solids having greater particle size. Where possible, it will be found advantageous to limit particle size to about one-fourth inch. On the other hand, there is no known limitation in utilizing the present invention with particles of much smaller size. Depending upon the type of apparatus which is utilized to separate the slurry, particles as small as one micron or smaller may be handled with facility by means of the present invention.

In carrying out the invention, after the solid is reduced to the desired particle size, it is mixed with an effective amount of a low molecular weight alcohol, particularly monohydric alcohol of 1 to 4 carbon atoms. Illustrative of such alcohols are methanol, ethanol, propanol, butanol isopropanol and isobutanol.

As was stated earlier, the solid material is mixed with "an effective amount" of the alcohol. In general, the most effective amount of alcohol is that amount which is necessary to substantially completely wet the solid material. However, some improved results will be achieved by using less than enough alcohol to completely wet the solid material. In general, an amount of alcohol equivalent to at least about 80% by weight of the total amount necessary to wet the solid material should be used, and it is preferred to use at least about 90%. A small excess can be used without deleterious effect. Preferably, we use 90 to 105% of the alcohol necessary to completely wet the solid.

We have found that similar materials such as glycerine, glycols, glycerols, etc. are much less effective than the low molecular weight alcohols; however, it is within the scope of the invention to utilize admixtures or solutions of the desired alcohols with such compatible compositions.

A wide selection of carrier liquid is available, depending upon the system utilized. In general, any hydrocarbon is technically suitable which is liquid and pumpable under the conditions of transportation. Within this framework the choice of carrier liquid will be determined by the character of the alcohol and the associated solid material. For instance, any normally liquid hydrocarbon, including crude oil and those normally liquid hydrocarbons such as wash oil, kerosene, diesel, gasoline, bunker oil, isopentane, hexane, heptane, and similar paraffins, benzene, toluene, xylene and derivatives of such aromatics, may, under certain circumstances, be suitable for use as a carrier liquid.

The slurry which is formed in practicing this invention may be formed utilizing a wide range of solids concentrations. It has been found that up to about 95% by weight of solid material and alcohol can be utilized when proper pumping facilities are available; however, in order to reduce the energy requirements of pumping, it will ordinarily be preferred to utilize a solid-alcohol concentration of from about 30% to about 60% by weight of the total slurry. Moreover, it has been found that an optimum concentration is about 50% by weight potash and alcohol.

As was stated earlier, in practicing this invention, the solid material is first mixed with the alcohol. This mixing may be accomplished by any means well known in the art, and commonly will consist of the steps of adding the solid material to an excess amount of the alcohol and thereafter agitating the mixture until the solid material is completely coated with the alcohol. In general, it is possible to determine beforehand the amount of alcohol which is necessary for a particular type and particle size range of the solid material. However, such predetermination is not necessary. Instead, the solid material may be added to an excess of the alcohol, and after agitation to completely wet the solid material, the mixture may be separated by simple gravity means, such as by straining or by opening a drain in the bottom of a container in which the mixture is held. It has been found that a slight excess, not exceeding about 5% of alcohol is not harmful to the method. If desired, vacuum filtration may be utilized to separate the excess alcohol from the solid material, although it is not necessary to utilize sophisticated methods of this type.

Once the solid material is mixed with the alcohol, it may then be combined with the carrier liquid to form a slurry, by several means well known in the art. Commonly, the slurry will be pumped into a pipeline in which is located the carrier liquid. By varying relative pump rates between the carrier material and the slurry, a slurry of any consistency may be achieved. Additionally, a batch-type process may be carried out wherein the solid material is added to the carrier fluid in a tank with accompanying agitation. The resulting slurry may then be removed to the pipeline or may be left within the tank until such time as it is to be utilized or transported.

In general, the solid to be carried in a pipeline is transported many hundreds of miles. To prevent overrunning of carrier fluid and slurry, the flow conditions should be maintained in turbulent flow. While Reynolds numbers of 3000 or more are generally operable, we prefer a Reynolds number of at least 20,000. Should the flow be interrupted for any reason, the pipeline is preferably shut down completely. Upon restoring flow, it is preferred that the pumps be started against a head and the flow be started rather abruptly. However, as will be seen later, once turbulent flow is restored, the interface between slurry and nonslurry carrier fluid will correct itself, and the interface will be fairly well defined.

Just as the formation of the slurry is a relatively simple matter which may be accomplished without difficulty by those skilled in the art, so also is the separation of the slurry a simple matter which can be achieved by techniques and apparatus commonly utilized for separation purposes. It has been found, for instance, that a hydrocyclone is quite suitable for removing the solid particles from the carrier liquid. Commonly, when a hydrocyclone is used for this purpose, it will be found desirable to make a plurality of passes through the hydrocyclone, the number of passes depending upon the desired purity of the separated products. Moreover, simple filtration, such as filtration through a plurality of excelsior mats may be utilized to remove relatively small particles from the carrier liquid passing from the hydrocyclone. In general, the particles which must be removed by filtration will be less than about 5 microns in size.

The above is not intended to suggest that a hydrocyclone combined with a mechanical filter is the only type of suitable separation scheme. There are any number of such schemes, such as flotation, gel precipitation, filtration and the like which can be practiced by those skilled in the art, and no criticality is attached to the method of such separation.

After the components of the slurry have thus been separated, it will often be found desirable to remove the alcohol from the solid material. Here again, depending upon the particular type of solid material which is to be separated, the techniques for such separation may vary widely. Most commonly, it will be found advantageous to heat the solid material in order to vaporize and drive off the alcohol adsorbed thereon. Thus, in the case of KCl and methanol, it is merely necessary to heat the potash to about 70° C. in order to completely dry the potash, and return it to its original condition. It is, of course, possible that it will not be necessary to make the soldi-alcohol separation. It is within the skill of the art to use other separating means, such as the use of a selective solvent, the choice of which, of course, will depend upon the particular materials being treated or, as another technique, pressure reduction for vaporization of the alcohol may be practiced. In any event, separation of the solid material from the alcohol will not always be necessary and, when such separation is necessary, the precise method for accomplishing it will be a mere matter of choice for those skilled in the art.

In one preferred aspect of the present invention, a slurry is formed comprising KCl, ethanol, and a normally liquid hydrocarbon, preferably gasoline, kerosene, or diesel oil. In such a system, it is preferred to utilize from about 40% to about 60% by weight of the alcohol wetted KCl in the slurry. In addition, when mixing the KCl with alcohol prior to forming the slurry, it is preferred to use alcohol at ambient temperatures since heating or cooling is not needed and it is unnecessary to expend this energy. It is preferred that the alcohol be liquid; however, in some cases, especially where the KCl is agglomerated, vaporous alcohol can be used to advantage to penetrate any pores.

EXAMPLE I

To illustrate the effect of alcohol on KCl in hydrocarbon, several mixtures were prepared of about 200 cc. in 250 cc. graduate cylinders. These mixtures were as follows. In the test wherein KCl is admixed with diesel fuel, approximately 50 weight percent solids is utilized. The mixtures were as follows:

(1) KCl crystals* precipitated from supersaturated brine in diesel fuel;
(2) Dry KCl crystals in diesel fuel;
(3) Dry KCl crystals completely wetted with methanol in diesel fuel;
(4) KCl* from precipitated supersaturated brine plus methanol in diesel fuel;
(5) Supersaturated brine; and
(6) Supersaturated brine with guar gum.

* These KCl crystals were wet with brine.

These samples were retained for about six months and were allowed to stand without agitation for periods up to one month to obtain maximum compaction. The graduates were periodically inverted and shaken to observe "fluidity" of the slurries. As was stated, this procedure was followed, at various time intervals up to one month's duration for a period of six months.

The samples containing methanol, samples 3 and 4, were still loose and flowed freely at the end of the period whereas in all the other tests, samples 1, 2, 5 and 6, the material tended to compact even after standing only a few hours and required vigorous shaking to resuspend.

From the above test, it can be seen that methanol wetting of KCl prevents compacting of the crystals when standing in a hydrocarbon liquid.

EXAMPLE II

A quantity of crystalline KCl is thoroughly mixed with an excess amount of plain methanol, and the excess methanol is allowed to drain off the KCl. The alcohol-wetted KCl is then slowly mixed with fresh kerosene in a reservoir. This mixture is constantly agitated during the addition of the alcohol-wetted KCl. The resulting slurry is approximately 50% by weight alcohol-wetted KCl.

This mixture is then pumped through a pipeline in turbulent flow conditions. Subsequently, the flow is interrupted and the system allowed to stand for at least 12 hours. At the end of this time the flow is again started and the slurry is immediately moved through the system without plugging. It is not necessary to utilize pure kerosene in re-establishing flow, nor is it necessary to gradually increase the rate of flow during this process.

A portion of the slurry is removed from the system and is separated in a hydrocyclone. The alcohol-wet KCl is then heated to approximately 70° C. in order to evaporate the alcohol.

Having thus described the invention by providing specific examples thereof, it is to be understood that no undue limitations or restrictions are to be drawn by reason thereof and that many variations and modifications are within the scope of the invention.

We claim:
1. A method for transporting particulate solid potash through a pipeline in a hydrocarbon carrier liquid which comprises the steps of:
   (a) wetting said potash with monohydric alcohols of 1 to 4 carbon atoms;
   (b) mixing the alcohol-wetted potash with said carrier liquid to form a slurry; and
   (c) moving said slurry through said pipeline.
2. The method defined in claim 1 wherein said potash is removed from said pipeline at a point remote from point of introduction.
3. The method defined in claim 2 wherein said slurry comprises from about 30% to about 60% by weight of wetted potash.
4. The method defined in claim 3 further characterized in that said hydrocarbon carrier liquid is selected from the group consisting of gasoline, diesel oil and kerosene.
5. The method defined in claim 4 wherein the potash was dry.
6. The method defined in claim 4 wherein the potash was wet with brine.
7. A method for handling potash which comprises the steps of:
   (a) mixing said potash with an excess of a monohydric alcohol to wet said potash;
   (b) removing excess alcohol from said potash;
   (c) mixing the alcohol-wet potash with a normally liquid hydrocarbon to form a slurry;
   (d) passing said slurry through a pipeline;
   (e) separating said alcohol-wet potash from said normally liquid hydrocarbon; and
   (f) heating the potash to drive off said alcohol.

References Cited

UNITED STATES PATENTS

| | | | |
|---|---|---|---|
| 3,206,256 | 9/1965 | Scott | 302—66 |
| 3,268,263 | 8/1966 | Olphen | 44—51 X |
| 3,264,038 | 8/1966 | Shock et al. | 302—66 |
| 3,380,784 | 4/1968 | Yingst et al. | 302—66 |

RICHARD D. LOVERING, Primary Examiner

U.S. Cl. X.R.

44—51; 252—309